(12) United States Patent
Ouyang et al.

(10) Patent No.: US 9,329,338 B2
(45) Date of Patent: May 3, 2016

(54) FULL-POLARIZATION-STATE POWER DISTRIBUTOR WITH INTEGER RATIO OF POWER DISTRIBUTION BASED ON PHOTONIC CRYSTAL WAVEGUIDE

(71) Applicants: Zhengbiao Ouyang, Shenzhen (CN);
Xin Jin, Shenzhen (CN)

(72) Inventors: Zhengbiao Ouyang, Shenzhen (CN);
Xin Jin, Shenzhen (CN)

(*) Notice: Subject to any disclaimer, the term of this patent is extended or adjusted under 35 U.S.C. 154(b) by 0 days.

(21) Appl. No.: 14/425,229

(22) PCT Filed: Aug. 12, 2013

(86) PCT No.: PCT/CN2013/081305
§ 371 (c)(1),
(2) Date: Mar. 2, 2015

(87) PCT Pub. No.: WO2014/032510
PCT Pub. Date: Mar. 6, 2014

(65) Prior Publication Data
US 2015/0219849 A1   Aug. 6, 2015

(30) Foreign Application Priority Data

Aug. 29, 2012 (CN) .......................... 2012 1 0312433

(51) Int. Cl.
| | |
|---|---|
| *G02B 6/26* | (2006.01) |
| *G02B 6/42* | (2006.01) |
| *G02B 6/122* | (2006.01) |
| *G02B 6/126* | (2006.01) |
| *B82Y 20/00* | (2011.01) |
| *G02B 6/12* | (2006.01) |

(52) U.S. Cl.
CPC ............... *G02B 6/1225* (2013.01); *B82Y 20/00* (2013.01); *G02B 6/126* (2013.01); *G02B 2006/1215* (2013.01); *G02F 2202/32* (2013.01)

(58) Field of Classification Search
CPC ................. G02B 6/1225; G02B 6/126; G02B 2006/1215; B82Y 20/00; G02F 2202/32
USPC ..................... 385/14, 39, 44, 45, 48
See application file for complete search history.

(56) References Cited

U.S. PATENT DOCUMENTS

| | | | |
|---|---|---|---|
| 5,335,240 A * | 8/1994 | Ho .......................... | B82Y 20/00 372/39 |
| 7,136,217 B2 * | 11/2006 | Kawakami ............. | B82Y 20/00 359/321 |

(Continued)

FOREIGN PATENT DOCUMENTS

| | | |
|---|---|---|
| CN | 101561531 | 10/2009 |
| CN | 102298172 | 12/2011 |

(Continued)

OTHER PUBLICATIONS

"Creation of large band gap with anisotropic annular photonic crystal slab structure" by Shi et al, Optics Express, vol. 18, No. 5, pp. 5221-5228, 2010.*

*Primary Examiner* — Robert Tavlykaev
(74) *Attorney, Agent, or Firm* — Hamre, Schumann, Mueller & Larson, P.C.

(57) ABSTRACT

The present invention discloses a full-polarization-state power distributor with integer ratio of power distribution based on photonic crystal waveguide which comprises a photonic crystal waveguide formed in a photonic crystal with a complete photonic band-gap, and the photonic crystal consists of background dielectric rod array; the photonic crystal waveguide consists of a transverse waveguide and a perpendicular waveguide perpendicularly connected with the transverse waveguide; one end of the transverse waveguide is an input end, and the other end is an output end; the perpendicular waveguide is another output end; and the middle part of the transverse waveguide is provided with waveguide defect dielectric rods. The structure of the present invention has a small volume, high light transmission efficiency, it is convenient for optical integration and highly efficient and it is suitable for large-scale optical integrated circuits and can realize the function of full-polarization-state power distribution with integer ratio for different wavelengths.

8 Claims, 4 Drawing Sheets

(56) References Cited

U.S. PATENT DOCUMENTS

| | | | |
|---|---|---|---|
| 2005/0053321 A1* | 3/2005 | Lidorikis | G02B 6/1225 385/15 |
| 2008/0112679 A1* | 5/2008 | Noda | G02B 6/1225 385/129 |
| 2008/0124037 A1* | 5/2008 | Noda | B82Y 20/00 385/129 |
| 2010/0104250 A1* | 4/2010 | Noda | B82Y 20/00 385/129 |

FOREIGN PATENT DOCUMENTS

| | | |
|---|---|---|
| CN | 102636839 | 8/2012 |
| CN | 102830463 | 12/2012 |
| WO | 2009/044713 | 4/2009 |

\* cited by examiner

FULL-POLARIZATION-STATE POWER DISTRIBUTOR WITH INTEGER RATIO OF POWER DISTRIBUTION BASED ON PHOTONIC CRYSTAL WAVEGUIDE

FIELD OF THE INVENTION

The present invention relates to the field of micro optical power distribution, in particular, to a micro optical full-polarization-state power distributor with integer ratio of power distribution based on photonic crystal waveguide.

BACKGROUND OF THE INVENTION

The power distributor with integer ratio of power distribution based on photonic crystal waveguide is an optical passive device which is necessary for a photonic crystal integrated optical circuit, and is a part that is necessary for various kinds of optoelectronic integrated units. The power distributor with integer ratio of power distribution based on photonic crystal waveguide can ideally distribute the light energy according to the integer ratio at the output ports, without obvious loss of reflection and scattering. Although plenty of optical path structures are proposed to solve the light energy loss induced by inherent refractive index and waveguide characteristic, the solutions can hardly achieve the intended effect.

Currently, most power distributors with integer ratio of power distribution based on photonic crystal waveguide are power distributors with integer ratio of power distribution designed for one polarization state (especially the TE polarization state), some of them need many additional dielectric rods, some split the light evenly according to the geometric symmetry, and some utilize a long path coupling waveguide (resulting a large volume). However, none of the above power distributors with integer ratio of power distribution based on photonic crystal waveguide can realize the distribution of mixed TE and TM lights according to an integer ratio at the same time, regardless of the types of the power distributors.

SUMMARY OF THE INVENTION

The object of the present invention is to overcome the shortcomings in the prior arts, and to provide an optical power distributor with integer ratio of power distribution based on a photonic crystal waveguide having a complete photonic bandgap, which can distribute the power according to the same ratio at the same time for both TE and TM polarizations.

To realize the above object, the present invention is realized through the following technical schemes.

The full-polarization-state power distributor with integer ratio of power distribution based on photonic crystal waveguide according to the present invention comprises a photonic crystal waveguide formed in a photonic crystal with a complete photonic bandgap, and the photonic crystal consists of background-dielectric-rod array; the photonic crystal waveguide comprises of a transverse waveguide and a perpendicular waveguide perpendicularly connected with the transverse waveguide; one port of the transverse waveguide is an input port, and the other port is an output port; the perpendicular waveguide is another output port; and the middle part of the transverse waveguide is provided with waveguide-defect dielectric rods.

Both the waveguide-defect dielectric rods and the background dielectric rods are uniaxial crystals, and the positive/negative characteristic of the waveguide-defect-dielectric-rod uniaxial crystal and the positive/negative characteristic of the background-dielectric-rod uniaxial crystal are opposite.

The optical axes of the background-dielectric-rod uniaxial crystal and the waveguide-defect dielectric rod uniaxial crystal in the photonic crystal waveguide are parallel to the axis of the background dielectric rod and the axis of the waveguide-defect dielectric rod, respectively.

The transverse waveguide has a structure formed by removing 1 or 2 or 3 or 4 rows of the dielectric rods from the photonic crystal; and the perpendicular waveguide has a structure formed by removing 1 or 2 to 3 or 4 columns of the dielectric rod from the photonic crystal.

The deletion type point defects are formed by deleting one background dielectric rod at each wall of the two sides of the connection section of the transverse waveguide with the perpendicular waveguide.

The number of the waveguide-defect dielectric rods is 1 or more.

The photonic crystal waveguide is a two-dimensional photonic crystal waveguide in tellurium dielectric material of tetragonal lattice, or a two-dimensional photonic crystal waveguide with honeycomb lattice, or a two-dimensional photonic crystal waveguide with poroid triangular lattice, or a two-dimensional photonic crystal waveguides with other irregular lattice.

The power integer ratio is 1:m or m:1, in which the m is a positive integer. The axes of the waveguide-defect dielectric rods in the photonic crystal are perpendicular to the propagation direction of the wave.

Compared with the prior arts, the present invention has the following advantages:

(1) The present invention can realize the function of full-polarization-state power distribution according to an integer ratio;

(2) The structure has the advantages of small volume, high light transmission efficiency, and is suitable for large-scale optical integrated circuits;

(3) The present invention can completely realize the full-polarization-state integer ratio power distribution function via two kinds of point defects in a short path, thus it is convenient for optical integration and highly efficient;

(4) By utilizing the scaling property of photonic crystals and scaling the lattice constant and other geometric parameters, the present invention can realize the function of full-polarization-state power distribution with integer ratio for different wavelengths.

Figure 1:
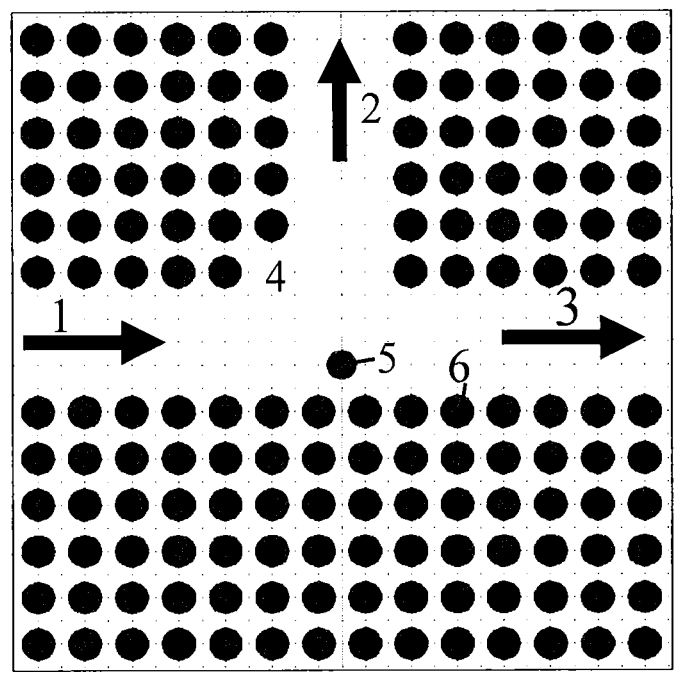
FIG. 1 is the schematic diagram showing the structure of the full-polarization-state power distributor with integer ratio of power distribution based on photonic crystal waveguide.

In which: input waveguide 1, upper output waveguide 2, right port output waveguide 3, deletion type point defect 4, waveguide-defect dielectric rod 5, background dielectric rod 6

Figure 2:
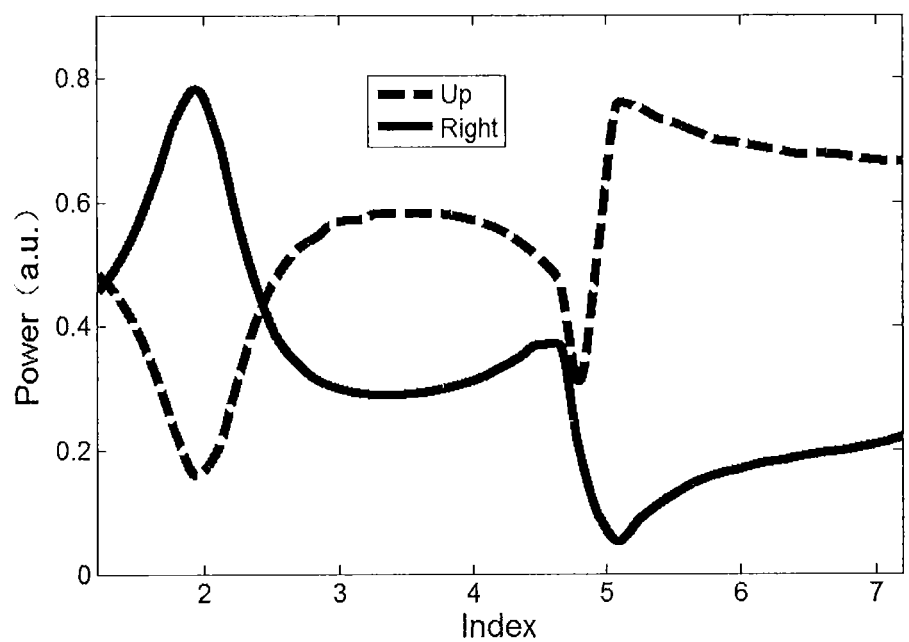

FIG. 2 is the diagram of the power distribution of the two channels versus the refractive index, while the input light is a TE wave.

Figure 3:
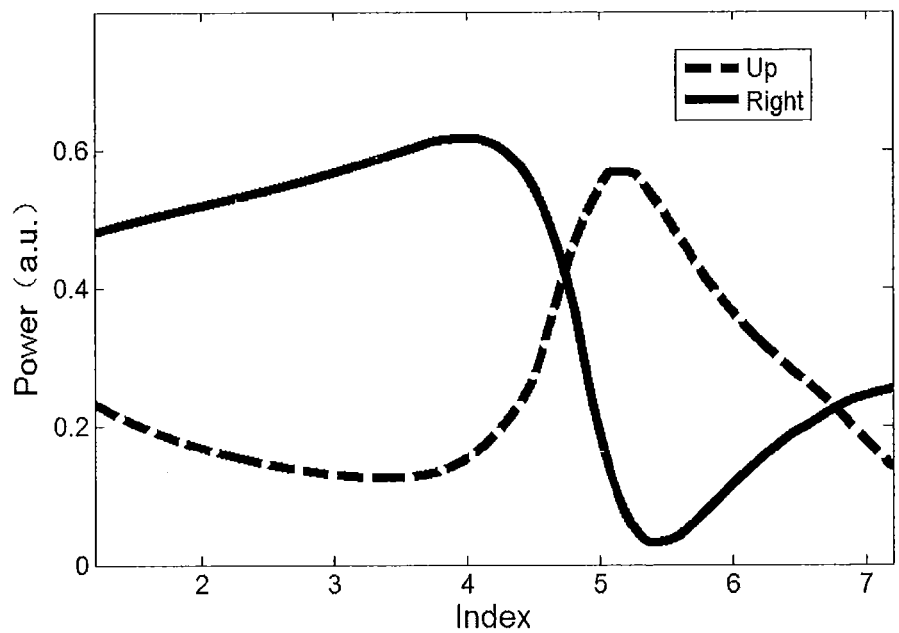

FIG. 3 is the diagram of the power distribution of the two channels versus the refractive index, while the input light is a TM wave.

Figure 4:
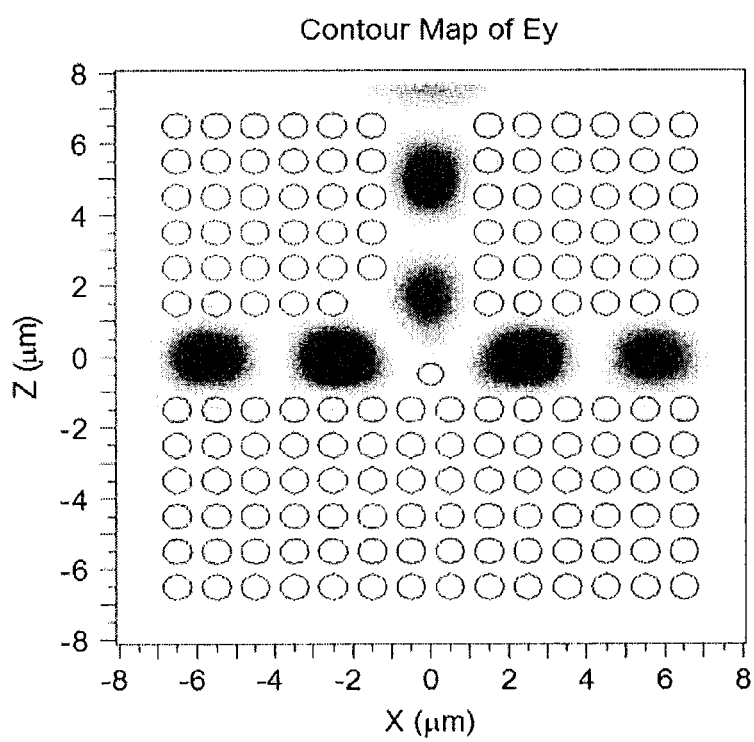

FIG. 4 is the simulated result of the TE component, while the ratio of the power at the two output ports is 1:1. In which, the direction of $E_y$ is perpendicular to and outward from the paper.

Figure 5:
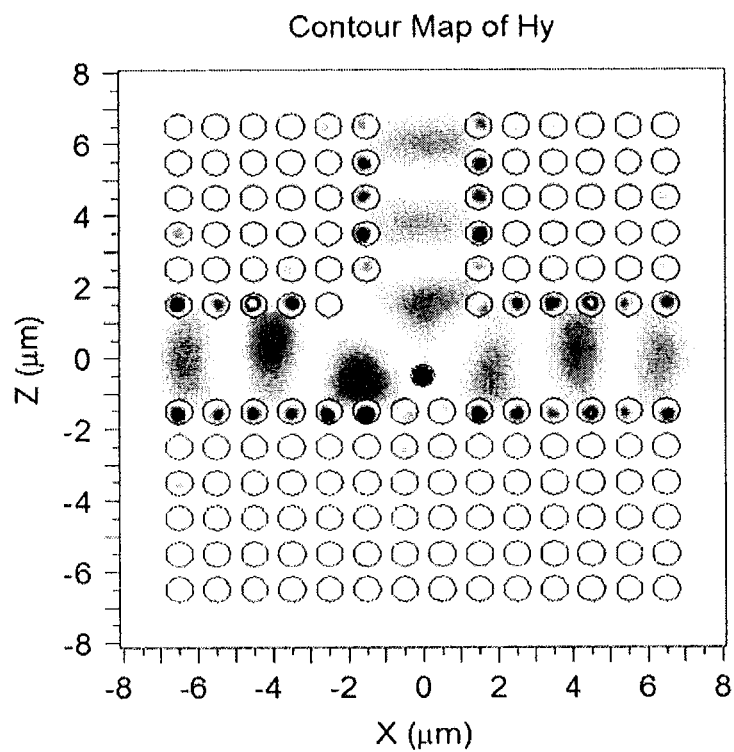

FIG. 5 is the simulated result of the TM component, while the ratio of the power at the two output ports is 1:1. In which, the direction of $H_y$ is perpendicular to and outward from the paper.

Figure 6:
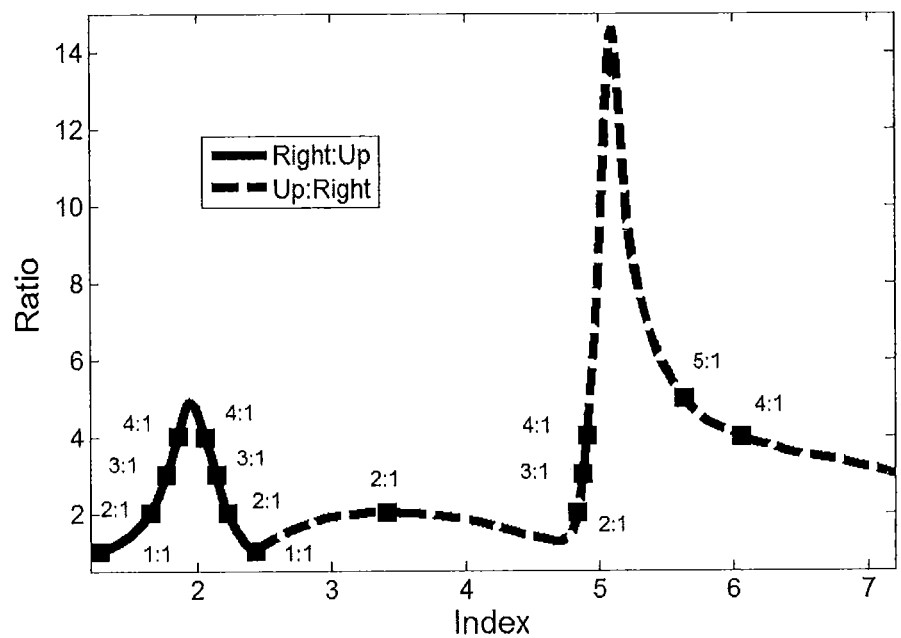

FIG. 6 is the diagram of the power of the upper and right channels in TE mode versus the refractive index of the point defect.

Figure 7:
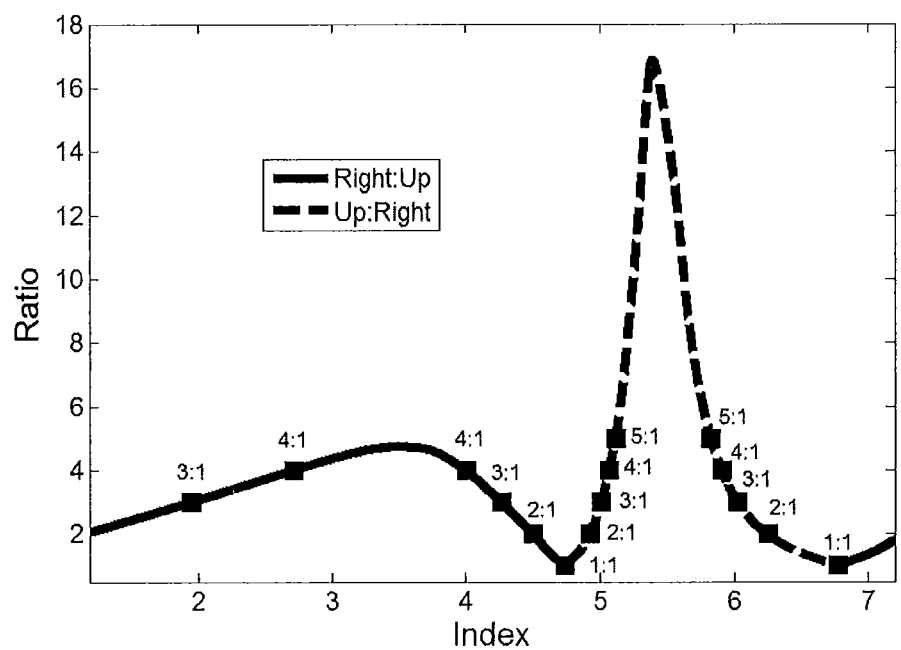

FIG. 7 is the diagram of the power of the upper and right channels in TM mode versus the refractive index of the point defect.

DETAILED DESCRIPTION OF THE INVENTION

A detailed description for the present invention will be given below in combination with the accompanying figures.

As shown in the above structure, the function of the structure is to output the wave with any polarization state input from the left input port from the upper port and right port according to an integer power ratio. The figure symbol 4 in FIG. 1 refers to the waveguide corner with one dielectric rod deleted, the purpose of the deleting is to allow more power to be guided into the upper output port while reducing the back reflection of the dielectric rod indicated by the figure symbol 5 in FIG. 1, thereby decreasing the light energy of the regular reflecting part. As an embodiment, the waveguide-defect dielectric rod 5 indicated by the figure symbol 5 in FIG. 1 can be a uniaxial negative crystal, and the background dielectric rods can be uniaxial positive crystals. The power distribution of light waves for each polarization state is controlled according to the same intensity by means of respectively adjusting the dielectric constant of the waveguide-defect dielectric rod 5 in the direction parallel to the paper and the dielectric constant of the waveguide-defect dielectric rod 5 in the direction perpendicular to the paper.

Considering that the input signal is equally distributed, that is, the lights are output from the upper port and the right port according to the splitting ratio 1:1, in order to satisfy the three-port instantaneous coupling equation in the following $$\frac{1}{\tau_1} = \frac{1}{\tau_2} + \frac{1}{\tau_3}, \tag{1}$$

the coupling life times in each direction should be $$\tau_1 : \tau_2 \tau_3 = 1.2.2 \tag{2}$$

The above equation shows an interesting phenomenon, in order that the intensity at either output port equals to half of that of the input signal, the coupling life times $\tau_2, \tau_3$ at the two output ports should be extended, and the life time at either output port is twice as much as $\tau_1$; at the same time, in order that the intensities at the two output ports are equal, it should be satisfied that the coupling life times at the two ports are equal, that is, $\tau_2 = \tau_3$.

In order to achieve a suitable coupling life time, it is assumed that the coupling life time is a related function of the structure and the optical frequency. The coupling rate can be written as follows:

$$v_m = \frac{d\left(\int_{\Omega}(m_+(\omega) + m_-(\omega))d\Omega\right)}{dt} \tag{3}$$
$$= v_{m+} + v_{m-},$$

where, $m_+(\omega)$ is the acceleration function of the defect structure M in one waveguide, $m_-(\omega)$ is the deceleration function of that with $m_+(\omega) > m_-(\omega)$, and $\Omega$ is the geometric area of a single defect form. Finally, an acceleration coefficient $v_{m+}$ and a deceleration coefficient $v_{m-}$ c an be achieved, that is, the $v_{m+}$ in the structure M can accelerate the coupling process and is positive; the $v_{m-}$ can decelerate the coupling process and is negative. Then, the coupling life time for the light wave passing through a defect with a structure function $M(\omega)$ is:

$$\tau_M = \frac{\int_{\Sigma} M(\omega) d\Sigma}{v_m}. \tag{4}$$

With respect to the coupling life time of a single point defect, it can be simplified as:

$$\tau_M = \frac{S_M}{v_{m+} + v_{m-}}, \tag{5}$$

where $S_m$ is the normalized coupling area. Then, once the $v_{m+}$ and $v_{m-}$ characteristics of the defect structures are found, the required coupling life time can be obtained.

First, the lattice constant is assumed to be a=1, and the radius of the point defect dielectric rod is assumed to be r=3.2a. For the input light wave of absolute TE wave with the wavelength λ=4.1a, the status of power distribution for the upper channel and the right channel versus the refractive index of the defect dielectric rod is shown in FIG. 2, wherein the refractive index is n=1.2~7.2. It can be seen that, the device realizes equal power distribution for the TE wave for the refractive index being n=1.2738 or 2.4402.

The situation of the TM mode input will be described thereinafter. Similarly, the lattice constant of the structure is a=1, and the radius of the point defect dielectric rod is r=3.2a. For the input light wave of an absolute TM wave with the wavelength λ=4.1a, the status of power distribution for the upper channel and the right channel versus the refractive index of the defect dielectric rod is shown in FIG. 3, wherein the refractive index is n=1.2~7.2. It can be seen that, the device realizes equal power distribution for the TM wave for the refractive index being n=4.7451 or 6.7788.

According to above results, a uniaxial negative crystal dielectric rod can be designed. The refractive index influencing the transmission of the TE wave is set as $n_e$, and the refractive index influencing the transmission of the TE wave is set as $n_o$, various point defects can be achieved by combination of the different refractive index parameters given in Table 1, and these point defects can realize the same effect, namely, can realize the function of equal power distribution regardless of the polarization state.

TABLE 1

| Splitting Ratio 1:1 | The required $n_e$ | 1.2738, 2.4402 |
|---|---|---|
| | The required $n_o$ | 4.7451, 6.7788 |

It can be seen from Table 1 that, there are four allowable combinations of the $n_e:n_o$ of the uniaxial crystal for achieving a power distribution ratio of 1:1, wherein the power distribution ratio is referred to as power splitting ratio for short. For example, such combination can be chosen: $n_e$=2.4402, and $n_o$=4.7451. By using this parameter combination for the point defect of the uniaxial negative crystal, and using the finite element method for simulation, the simulated results are shown in FIG. 4 and FIG. 5. The simulated results show that, with the same point defect, whether the input light is a TE wave or a TM wave, the power can be equally distributed to the two output ports, so that the function of equal power distribution regardless of the polarization state can be achieved.

Similarly, the integer output ratio other than 1:1 can be achieved by differently setting the refractive indexes for the ordinary light and extraordinary light in the defect. Regarding to the TE wave, as shown in FIG. 6, the solid line indicates the obtained ratios, which are defined as the ratios of the output powers at the right port to that at the upper port. It can be found that the allowable maximal ratio is 4:1, and the corresponding refractive indexes for each ratio can be found at two sides of the peak of the curve line. The dash line in FIG. 6 indicates the ratios of the output powers at the upper port to that at the right port. It can be founded that the allowable maximal ratio is 14:1. The required refractive indexes of the waveguide-defect dielectric rods corresponding to the integer ratios less than 5 on the two kinds of lines are shown in Table 2.

TABLE 2

| Ratio Formulae | Splitting Ratio | | | |
|---|---|---|---|---|
| | 1:1 | 2:1 | 3:1 | 4:1 |
| Right:Up | 1.2738 | 1.6479 | 1.77 | 1.8594 |
| | 2.4402 | 2.2311 | 2.1459 | 2.0616 |
| Up:Right | 1.2738 | 3.4104 | 4.8792 | 4.9074 |
| | 2.4402 | 4.8381 | | 6.0636 |

For the radius of the defect dielectric rod 5 in FIG. 1 being r=3.2a and the refractive index of any value in the above Table 2, the structure shown in FIG. 1 can realize the distribution according to the corresponding ratio for TE input light.

The situation of the TM mode input will be described thereinafter. Similarly, as shown in FIG. 7, the solid line also indicates that the obtained ratios are the ratios of the output power at the right port to the output powers at the upper port, it can be found that the allowable maximal ratio is 4:1, and the corresponding refractive indexes for each ratio can be found at two sides of the peak of the curve line. The dash line indicates the ratios of the output powers at the upper port to the output powers at the right port. It can be found that the allowable maximal ratio is 14:1. The required refractive indexes of the waveguide-defect dielectric rods corresponding to the integer ratios less than 5 on the two kinds of lines are shown in Table 3.

TABLE 3

| Ratio Formulae | Splitting Ratio | | | |
|---|---|---|---|---|
| | 1:1 | 2:1 | 3:1 | 4:1 |
| Right:Up | 4.7451 | 4.509 | 1.9539 | 2.718 |
| | 6.7788 | | 4.2753 | 4.0092 |
| Up:Right | 4.7451 | 4.9245 | 5.013 | 5.0709 |
| | 6.7788 | 6.2508 | 6.027 | 5.9076 |

For the radius of the defect dielectric rod 5 in FIG. 1 being r=3.2a and the refractive index of any value in the above Table 3, the structure shown in FIG. 1 can realize the distribution according to the corresponding ratio for TM input light.

In this way, the indexes respectively meeting the condition of the splitting ratios 1:1, 2:1, 3:1, or 4:1 are calculated for the lattice constant a=1, the radius of the point defect dielectric rod r=3.2a, the input light wavelength A=4.1a, an input of a TE or TM wave, and the refractive index range n=1.2-7.2. By combing Table 2 and Table 3 such that each obtained refractive index in Table 2 acts as the refractive index for extraordinary light in the defect dielectric rod and each obtained refractive index in Table 3 acts as the refractive index for ordinary light in the defect dielectric rod, Table 4 can be obtained. Table 4 gives the required values of refractive index of the waveguide-defect dielectric rod in the power distributor with integer ratio, wherein the power distributor has a same splitting ratio for both TE wave and TM wave, and the waveguide-defect dielectric rod is made from uniaxial negative crystal.

According to Table 4, proper refractive index parameter combinations of the uniaxial negative crystal can be found for various required integer splitting ratios, by positioning this uniaxial negative crystal at the specified position (0, −0.5) in the waveguide, the structure shown in FIG. 1 can distribute the light according to a given integer splitting ratio, and the splitting ratio is independent of the polarization direction of the input light. The parameters corresponding to other higher integer splitting ratios can also be achieved by using this method.

In the present invention, both TE and TM light waves can propagate in a fundamental mode in the waveguides formed by deleting two lines or two rows at the center in a square lattice photonic crystal made of uniaxial positive crystal tellurium rods. The e-light optical axis of each of the background tellurium dielectric rods in the photonic crystal must satisfy that it is consistent with the direction of the axis of the cylinder. The operating wavelength can be adjusted by the lattice constant of the photonic crystal.

The above embodiment and application range of the present invention can be improved, and should not be understood as the limit of the invention.

TABLE 4

| Splitting Ratio | Ratio Formulae | | | |
|---|---|---|---|---|
| | | Right:Up | | Up:Right |
| 1:1 | $n_o$ | 4.7451, 6.7788 | $n_o$ | 4.7451, 6.7788 |
| | $n_e$ | 1.2738, 2.4402 | $n_e$ | 1.2738, 2.4402 |
| 2:1 | $n_o$ | 4.509 | $n_o$ | 4.9245, 6.2508 |
| | $n_e$ | 1.6479, 2.2311 | $n_e$ | 3.4104, 4.8381 |
| 3:1 | $n_o$ | 1.9539, 4.2753 | $n_o$ | 5.013, 6.027 |
| | $n_e$ | 1.77, 2.1459 | $n_e$ | 4.8792 |
| 4:1 | $n_o$ | 2.718, 4.0092 | $n_o$ | 5.0709, 5.9076 |
| | $n_e$ | 1.8594, 2.0616 | $n_e$ | 4.9074, 6.0636 |

We claim:

1. A full-polarization-state power distributor with an integer ratio of power distribution based on a photonic crystal waveguide comprising:
   a photonic crystal waveguide formed in a photonic crystal with a complete bandgap, wherein the photonic crystal includes a background-dielectric-rod array, and the photonic crystal waveguide includes a transverse waveguide and a perpendicular waveguide that is perpendicularly connected with the transverse waveguide;
   a deletion type point defect, wherein the deletion type point defect is formed by deleting one background dielectric rod at each wall of two sides of a connection section of the transverse waveguide and the perpendicular waveguide, and the transverse waveguide has a structure formed without a row of the dielectric rods from the photonic crystal, and the perpendicular waveguide has a structure formed without a column of the dielectric rods from the photonic crystal, and wherein one port of the transverse waveguide is an input port, and another port is an output port, the perpendicular waveguide is another output port; and a middle part of the transverse waveguide is provided with waveguide-defect dielectric rods, the waveguide defect dielectric rods and the background dielectric rods are uniaxial crystals and wherein a positive/negative characteristic of a waveguide defect dielectric rod uniaxial crystal and a positive/negative characteristic of a background dielectric rod uniaxial crystal are opposite.

2. The full-polarization-state power distributor of claim 1, wherein optical axes of the background-dielectric-rod uniaxial crystal and the waveguide-defect-dielectric-rod uniaxial crystal in the photonic crystal waveguide are parallel to an axis of the background dielectric rod and an axis of a waveguide-defect dielectric rod, respectively.

3. The full-polarization-state power distributor of claim 1, wherein the number of the waveguide-defect dielectric rods is 1 or more.

4. The full-polarization-state power distributor of claim 1, wherein the photonic crystal waveguide is a two-dimensional photonic crystal waveguide in tellurium dielectric material of a tetragonal lattice, or a two-dimensional photonic crystal waveguide with a honeycomb lattice, or a two-dimensional photonic crystal waveguide with a poroid triangular lattice, or a two-dimensional photonic crystal waveguides with an irregular lattice.

5. The full-polarization-state power distributor of claim 1, wherein a power integer ratio is 1:m or m:1, in which m is a positive integer.

6. The full-polarization-state power distributor of claim 1, wherein axes of the waveguide-defect dielectric rods in the photonic crystal are perpendicular to a propagation direction of a wave.

7. The full-polarization-state power distributor of claim 1, wherein the transverse waveguide structure does not have 2 or 3 or 4 of the dielectric rods from the photonic crystal.

8. The full-polarization-state power distributor of claim 1, wherein the perpendicular waveguide structure does not have 2 or 3 or 4 columns of the dielectric rods from the photonic crystal.

* * * * *